(12) United States Patent
Yoon (10) Patent No.: US 7,415,251 B2
(45) Date of Patent: Aug. 19, 2008

(54) APPARATUS AND METHOD FOR IMPROVING EFFICIENCY OF A POWER AMPLIFIER HAVING A HIGH PEAK-TO-AVERAGE POWER RATIO

(75) Inventor: Hyun-Su Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 607 days.

(21) Appl. No.: 10/971,730

(22) Filed: Oct. 25, 2004

(65) Prior Publication Data

US 2005/0153675 A1 Jul. 14, 2005

(30) Foreign Application Priority Data

Oct. 23, 2003 (KR) .................. 10-2003-0074425

(51) Int. Cl.
*H04B 1/04* (2006.01)
(52) U.S. Cl. .................... 455/114.2; 455/103; 455/126; 330/126
(58) Field of Classification Search ................ 455/501, 455/103, 67.13, 114.2, 114.3, 115.1, 127.1, 455/126; 330/126, 124 R, 296; 375/296
See application file for complete search history.

(56) References Cited

U.S. PATENT DOCUMENTS

| | | | | |
|---|---|---|---|---|
| 6,292,054 B1 * | 9/2001 | Ma et al. | .................... | 330/126 |
| 6,396,341 B1 * | 5/2002 | Pehlke | .......................... | 330/10 |
| 6,624,694 B2 * | 9/2003 | Ma et al. | ..................... | 330/126 |
| 7,136,628 B2 * | 11/2006 | Yang et al. | ............... | 455/114.3 |
| 2001/0043118 A1 * | 11/2001 | Suzuki et al. | ............... | 330/151 |
| 2004/0097201 A1 * | 5/2004 | Yoon | .......................... | 455/103 |
| 2004/0266368 A1 * | 12/2004 | Rosnell | ...................... | 455/110 |
| 2006/0114060 A1 * | 6/2006 | Hellberg et al. | ......... | 330/124 R |

* cited by examiner

*Primary Examiner*—Blane J Jackson
(74) *Attorney, Agent, or Firm*—Roylance, Abrams, Berdo & Goodman LLP (57) ABSTRACT

A power amplification apparatus and method for amplifying a baseband signal having a high peak-to-average power ratio (PAR) are provided. The power amplification apparatus and method comprise a signal generation section for generating a peak-reduced signal obtained by subtracting a peak value from the baseband signal and an error signal representing a difference between the baseband signal and the peak-reduced signal and for outputting the generated signals; a peak-reduced signal amplification section for amplifying the peak-reduced signal output from the signal generation section in a radio frequency band; an error correction amplification section for amplifying the error signal output from the signal generation section in the radio frequency band; and a summer for coupling and outputting the signal amplified by the peak-reduced signal amplification section and the signal amplified by the error correction amplification section.

16 Claims, 10 Drawing Sheets

APPARATUS AND METHOD FOR IMPROVING EFFICIENCY OF A POWER AMPLIFIER HAVING A HIGH PEAK-TO-AVERAGE POWER RATIO

PRIORITY

This application claims the benefit under 35 U.S.C. 119(a) of an application entitled "Apparatus and Method for Improving Efficiency of Power Amplifier having High Peak-to-Average Power Ratio" filed in the Korean Intellectual Property Office on Oct. 23, 2003 and assigned Ser. No. 2003-74425, the entire contents of which are incorporated herein by reference.

BACKGROUND OF THE INVENTION

1. Field of the Invention

The present invention relates to a power amplifier. More particularly, the present invention relates to an apparatus and a method for improving the efficiency of a power amplifier which operates with a signal having a high peak-to-average power ratio.

2. Description of the Related Art

In a conventional radio communication system such as a cellular system, a base station uses a power amplifier to communicate with user terminals which are located within a predetermined service area. The power amplifier amplifies and transmits radio frequency (RF) signals used in a communication system for transmitting multiple signals.

Specifically, in a cellular system using a code division multiple access (CDMA) technique, an orthogonal frequency division multiplexing (OFDM) technique or the like, it is necessary owing to its particular characteristics to transmit modulated multiple signals having a high peak-to-average power ratio ('PAR') to multiple users or user terminals sharing the same frequency band. Conventional power amplifiers used to amplify a radio frequency signal in such a communication system results in the consumption of a lot of power because it is necessary to amplify and transmit a signal having a high PAR, which is inefficient and increases the manufacturing cost.

A peak reduction scheme for reducing a peak value of a signal is typically used to decrease the average power loss in a power amplifier which operates with a signal having a high PAR. Such schemes include "*Clipping Noise Mitigation for OFDM by Decision-aided Reconstruction*", to Kim et al, IEEE Communications Letters, Vol. 3, No. 1 January 1999 and "*Design Considerations for Multicarrier CDMA Base Station Power Amplifiers*", to J. S. Kenney et al, Microwave Journal, February 1999 which are incorporated herein by reference.

Figure 1:
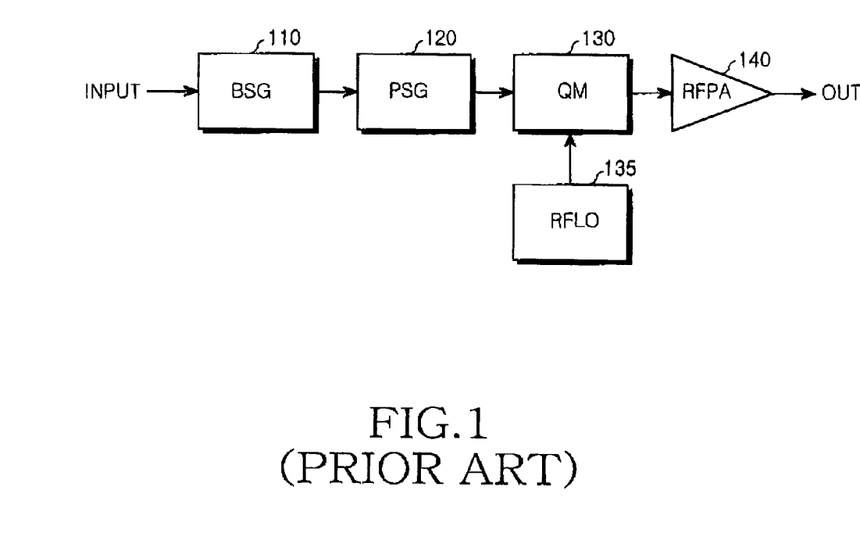
FIG. 1 is a block diagram illustrating an apparatus for improving the efficiency of a power amplifier using a conventional peak reduction scheme.

FIG. 1 is a block diagram illustrating an apparatus for improving the efficiency of a power amplifier using a conventional peak reduction scheme.

According to a conventional peak reduction scheme, when an input signal having a high PAR is input from a base band source signal generator ('BSG') 110 to a peak-reduced signal generator ('PSG') 120, the PSG 120 detects a peak signal of the input signal and reduces the level of the detected peak signal, thereby outputting a signal having a reduced PAR. A signal output from the PSG 120 is coupled to a local oscillation signal, which is output from an RF local oscillator ('RFLO') 135, by a quadrature modulator ('QM') 130, thereby being converted into a quadrature-modulated RF signal. An RF power amplifier ('RFPA') 140 amplifies the quadrature-modulated RF signal output from the QM 130 and transmits the amplified signal to an antenna.

According to the conventional peak reduction scheme, as the PAR of a signal becomes lower, the efficiency of the power amplifier improves, but an error rate and spectral re-growth of the signal increases, so that a signal characteristic is significantly deteriorated. That is, when the peak reduction scheme is used, there is a limitation in improving the efficiency of a power amplifier. Therefore, it is necessary to develop a technique capable of effectively improving the efficiency of a power amplifier without increasing the error rate of a signal.

SUMMARY OF THE INVENTION

Accordingly, the present invention has been made to solve the above-mentioned problems occurring in the prior art, and an object of the present invention is to provide an apparatus and a method for improving the efficiency of a power amplifier which amplifies a signal having a high peak-to-average power ratio.

Another object of the present invention is to provide an apparatus and a method for improving the efficiency of the power amplifier by reducing average power consumption caused by the power amplifier.

Still another object of the present invention is to provide an apparatus and a method for improving the efficiency of the power amplifier without increasing an error rate of a signal caused by the power amplifier.

Still another object of the present invention is to provide an apparatus and a method for improving the efficiency of the power amplifier by detecting an error signal from a signal input into the power amplifier and amplifying the detected signal using a separate power amplifier.

To accomplish this object, in accordance with one aspect of the present invention, there is provided a power amplification apparatus for amplifying a baseband signal having a high peak-to-average power ratio (PAR). The power amplification apparatus comprises a signal generation section for generating a peak-reduced signal obtained by subtracting a peak value from the baseband signal and an error signal representing a difference between the baseband signal and the peak-reduced signal and for outputting the generated signals; a peak-reduced signal amplification section for amplifying the peak-reduced signal output from the signal generation section in a radio frequency band; an error correction amplification section for amplifying the error signal output from the signal generation section in the radio frequency band; and a summer for coupling and outputting the signal amplified by the peak-reduced signal amplification section and the signal amplified by the error correction amplification section.

In accordance with another aspect of the present invention, there is provided a method for improving efficiency of a power amplifier which amplifies a baseband signal having a high peak-to-average power ratio (PAR). The method comprises: generating a peak-reduced signal obtained by subtracting a peak value from the baseband signal having a high peak-to-average power ratio and an error signal representing a difference between the baseband signal and the peak-reduced signal; amplifying the peak-reduced signal and the error signal in a radio frequency band; and coupling the amplified peak-reduced signal and the amplified error signal.

In accordance with still another aspect of the present invention, there is provided a power amplification apparatus for amplifying a baseband signal having a high peak-to-average power ratio (PAR). The power amplification apparatus comprises a signal generation section for generating and outputting a peak-reduced signal obtained by subtracting a peak value from the baseband signal and an error signal representing a difference between the baseband signal and the peak-reduced signal and for generating and outputting a quadrature-modulated signal envelope detection level of each of the peak-reduced signal and the error signal using envelopes of the generated peak-reduced signal and error signal; a peak-reduced signal amplification section for amplifying the peak-reduced signal output from the signal generation section in a bias adaptation scheme in radio frequency band; a first bias adaptation control section for generating a bias adaptation control signal using the quadrature-modulated signal envelope detection level of the peak-reduced signal output from the signal generation section and for outputting the generated bias adaptation control signal to the peak-reduced signal amplification section; an error correction amplification section for amplifying the error signal output from the signal generation section in a bias adaptation scheme in radio frequency band; a second bias adaptation control section for generating a bias adaptation control signal using the quadrature-modulated signal envelope detection level of the error signal output from the signal generation section and for outputting the generated bias adaptation control signal to the error correction amplification section; and a summer for coupling and outputting the signal amplified by the peak-reduced signal amplification section and the signal amplified by the error correction amplification section.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, embodiments of an apparatus and a method for improving the efficiency of a power amplifier according to the present invention will be described with reference to the accompanying drawings. In the following description of the present invention, a detailed description of known functions and configurations incorporated herein will be omitted for conciseness.

A power amplifier for amplifying a radio frequency signal according to an embodiment of the present invention detects a peak signal of a baseband source signal (hereinafter, referred to 'baseband signal' or 'BS') having a high peak-to-average power ratio ('PAR'), amplifies a peak-reduced signal (PRS) remaining after the peak signal is removed from the baseband signal and an error signal (ES) representing a difference between the baseband signal and the peak-reduced signal using separate amplifiers, respectively, and then couples the amplified peak-reduced signal and the amplified error signal with each other.

To this end, an apparatus according to an embodiment of the present invention includes a signal generation section for generating and outputting the peak-reduced signal and the error signal, a peak-reduced signal amplification section for amplifying the peak-reduced signal output from the signal generation section in a radio frequency band, an error correction amplification section for amplifying the error signal output from the signal generation section in a radio frequency band, and a summer for coupling a signal amplified by the peak-reduced signal amplification section and a signal amplified by the error correction amplification section with each other and finally outputting the coupled signal.

Hereinafter, the components of the signal generation section, the peak-reduced signal amplification section, and the error correction amplification section will be described with those preferred arrangement through four embodiments.

When the spectral re-growths of the peak-reduced signal amplification section and the error correction amplification section are coupled with each other in a summer, it is possible, to some degree, to compensate for an error rate that increased when the peak-reduced signal is generated from the signal generation section and to cancel spectral re-growths added to the peak-reduced signal and an error signal, by maintaining output signals of the two amplification sections to have the same transmission time (delay time), the same size, and a phase difference of 180° from each other using an error quadrature modulator. However, there is a restriction in compensating for error rates and canceling the amount of spectral re-growth in the summer because of a change of the sizes and phases of components in the two amplification sections depending on the operating environment, so that it is necessary that the signal generation section generates a peak-reduced signal having the small amount of spectral re-growth and a low error rate and an error signal having the small amount of spectral re-growth.

Figure 2:
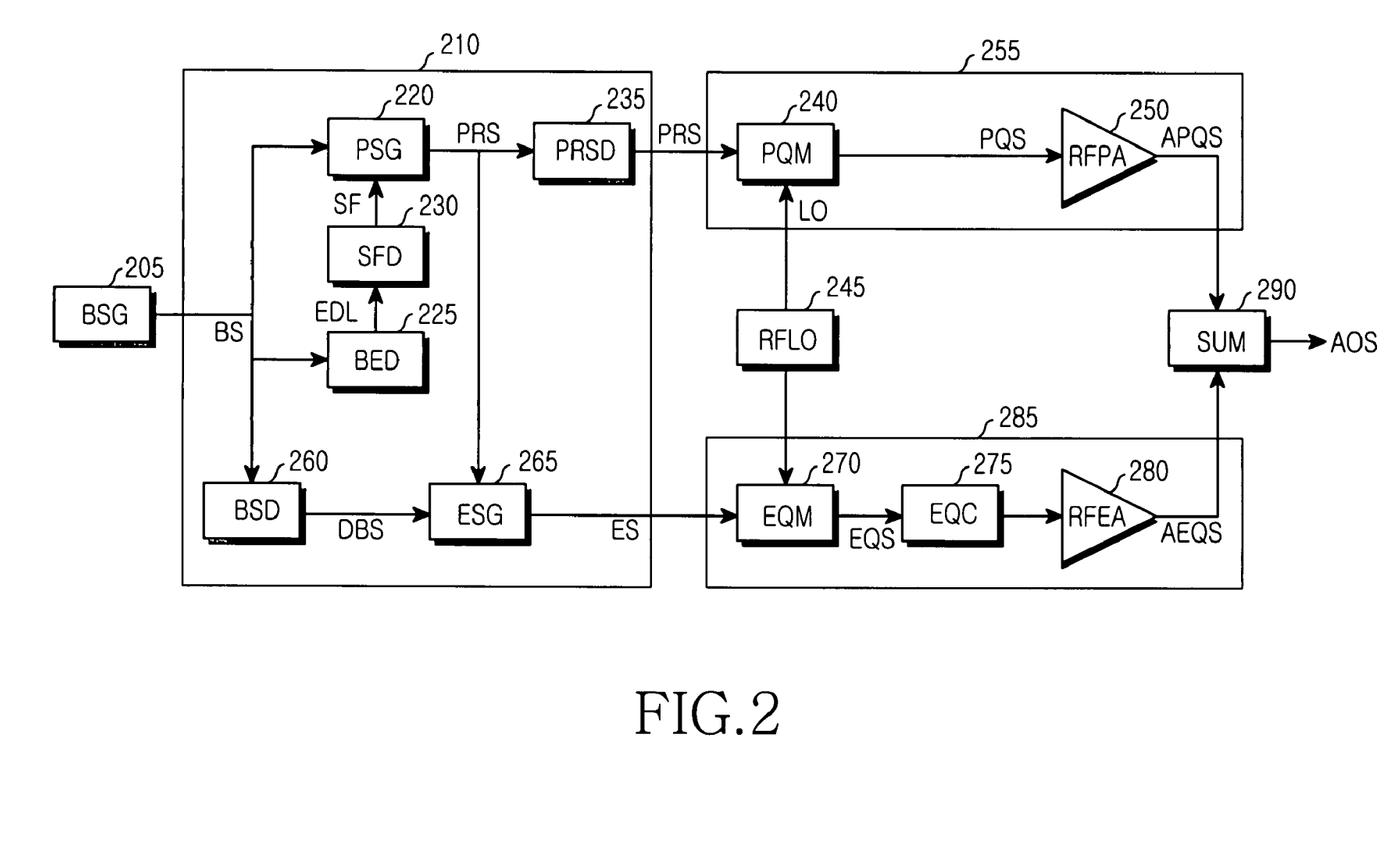
FIG. 2 is a block diagram illustrating an apparatus for improving the efficiency of a power amplifier according to a first embodiment of the present invention.
Figure 6:
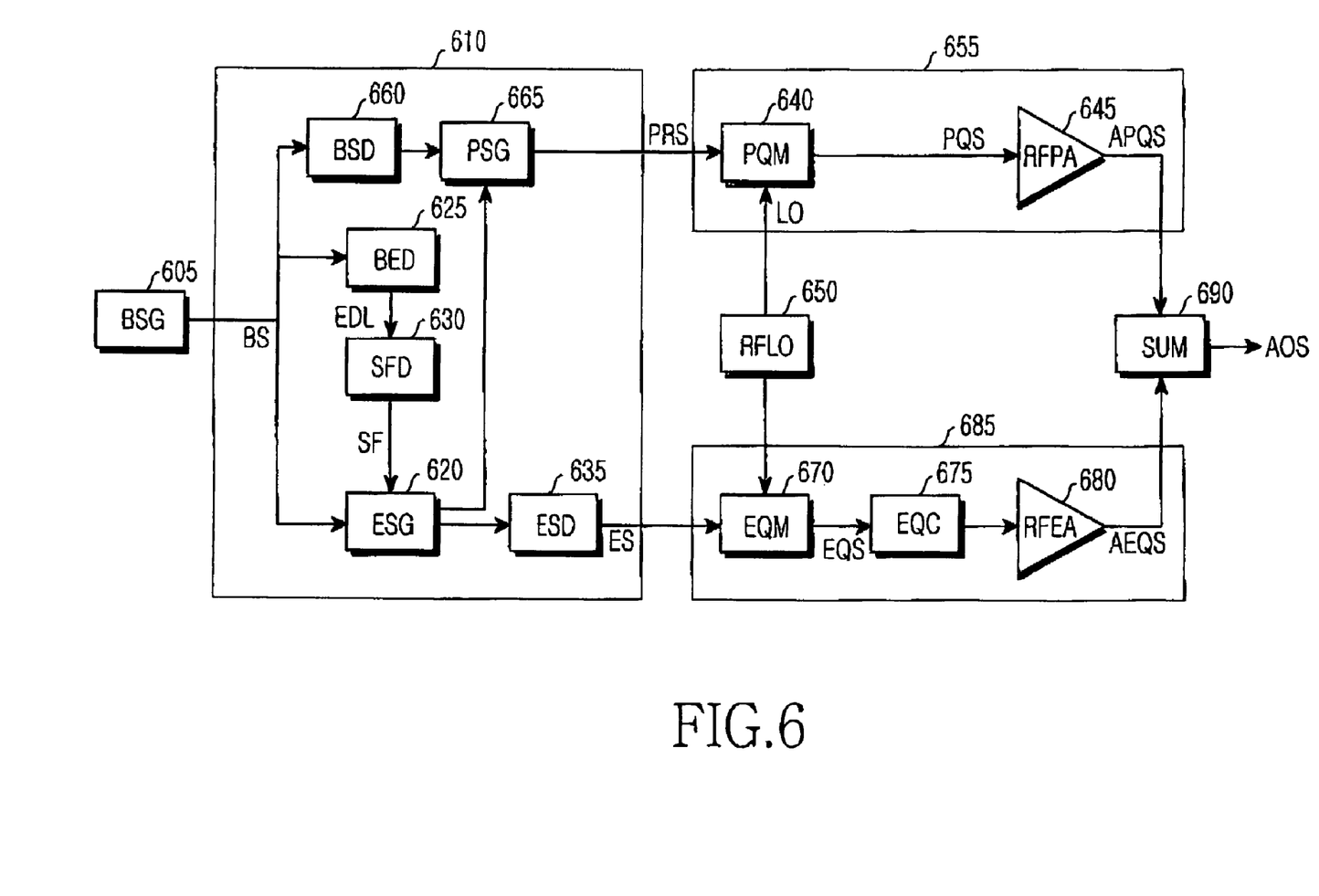
FIG. 6 is a block diagram illustrating an apparatus for improving the efficiency of a power amplifier according to a second embodiment of the present invention.

Therefore, the signal generation section either may first generate a first peak-reduced signal from a baseband signal using a scale factor (SF) and then generate a first error signal which is a difference between the baseband signal and the first peak-reduced signal using the apparatus shown in FIG. 2, or may first generate a second error signal from a baseband signal using a scale factor and then generate a second peak-reduced signal which is a difference between the baseband signal and the second error signal using the apparatus shown in FIG. 6.

Figure 8:
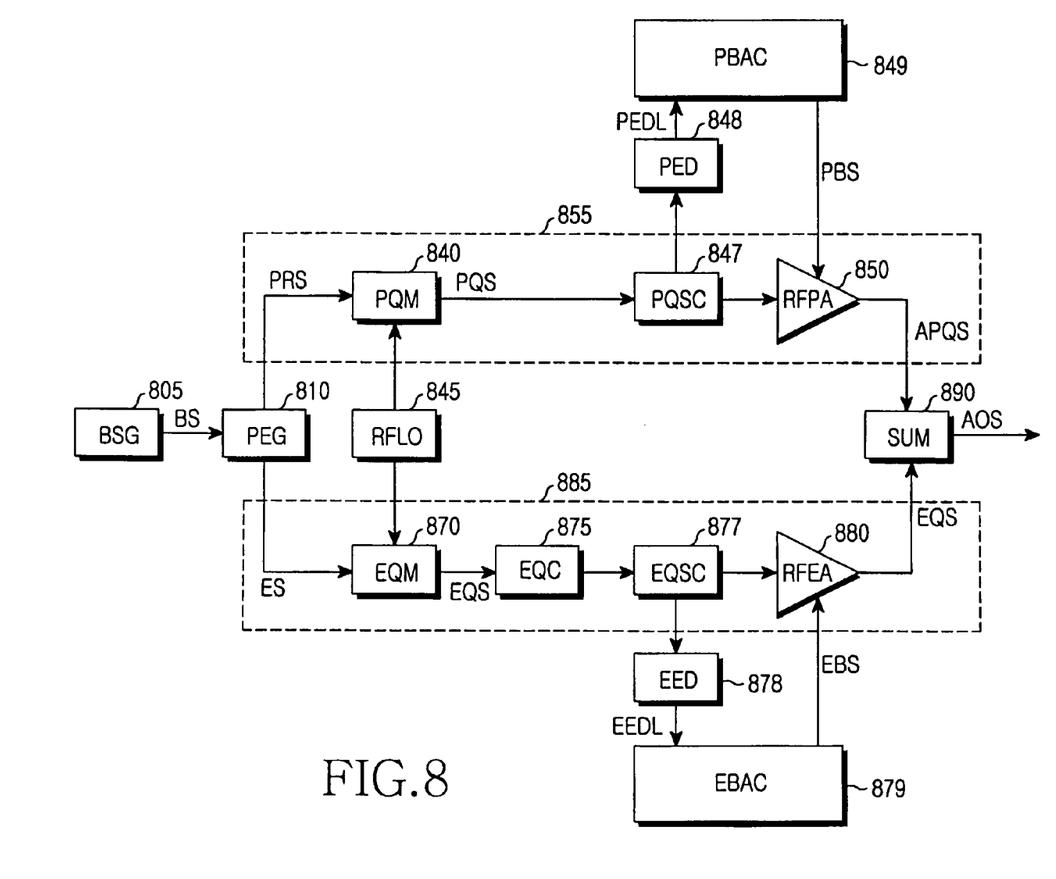
FIG. 8 is a block diagram illustrating an apparatus for improving the efficiency of a power amplifier according to a third embodiment of the present invention.
Figure 9:
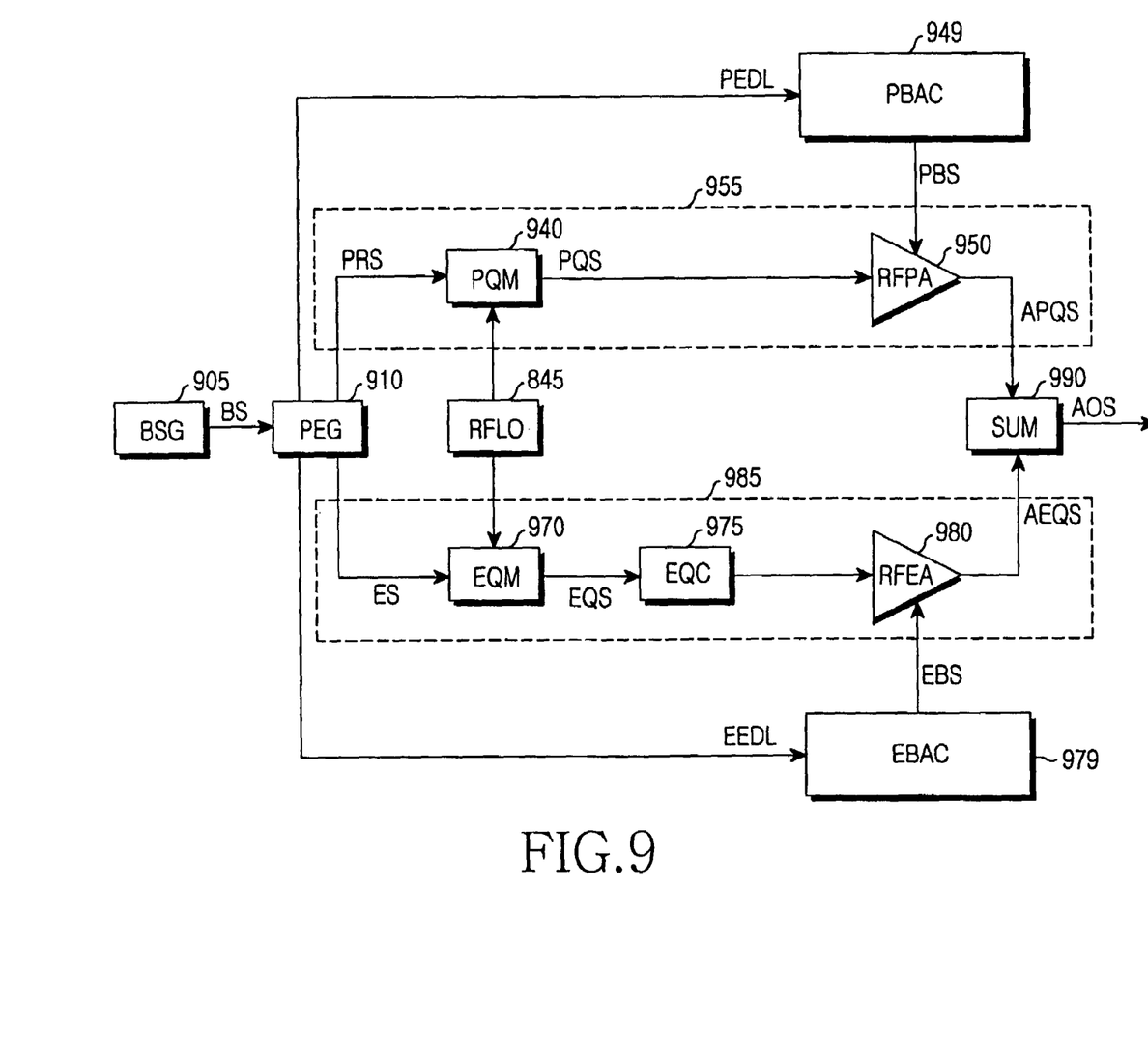
FIG. 9 is a block diagram illustrating an apparatus for improving the efficiency of a power amplifier according to a fourth embodiment of the present invention.

FIGS. 8 and 9, which show other embodiments of the present invention, are block diagrams illustrating constructions in which a bias adaptation scheme is applied to radio frequency power amplifiers RFPA and RFEA so as to improve the efficiency and the linearity of the peak-reduced signal amplification section and the error correction amplification section in a transmission structure of a base station using peak reduction and error compensation.

FIG. 8 illustrates an example in which envelope detection for bias adaptation in a transmission structure of a base station using peak reduction and error compensation is performed in a radio frequency band.

FIG. 9 illustrates an example in which envelope detection for bias adaptation in a transmission structure of a base station using peak reduction and error compensation is performed in a baseband.

First, an apparatus for improving the efficiency of a power amplifier according to a first embodiment of the present invention will be described with reference to FIG. 2.

The apparatus shown in FIG. 2 includes a baseband signal generator (BSG) 205, a signal generation section 210, a peak-reduced signal amplification section (main amplification section) 255, an error correction amplification section 285, and a summer (SUM) 290. The baseband signal generator 205 generates a baseband signal having a high PAR. The signal generation section 210 generates and outputs a peak-reduced signal obtained by reducing a peak value of the baseband signal and an error signal representing a difference between the baseband signal and the peak-reduced signal. The peak-reduced signal amplification section 255 amplifies the peak-reduced signal output from the signal generation section 210 in a radio frequency band, and the error correction amplification section 285 amplifies the error signal output from the signal generation section 210 in a radio frequency band. The summer 290 couples a signal amplified by the peak-reduced signal amplification section 255 and a signal amplified by the error correction amplification section 285 to each other and outputs the coupled signal.

A construction for obtaining the peak-reduced signal in the signal generation section 210 will now be described. A BS envelope detector (BED) 225 detects envelope information (i.e., a signal envelope detection level; EDL) of the baseband signal, and then a scale factor decider (SFD) 230 determines a scale factor (SF) for reducing the peak value of the baseband signal using the size information (EDL) detected by the envelope detector 225. The scale factor represents a rate for reducing the peak value and is determined for minimizing the spectral re-growths of a peak-reduced signal and an error signal. The scale factor is obtained using well-known peak reduction schemes. Therefore, a detailed description will be omitted.

Figure 3A:
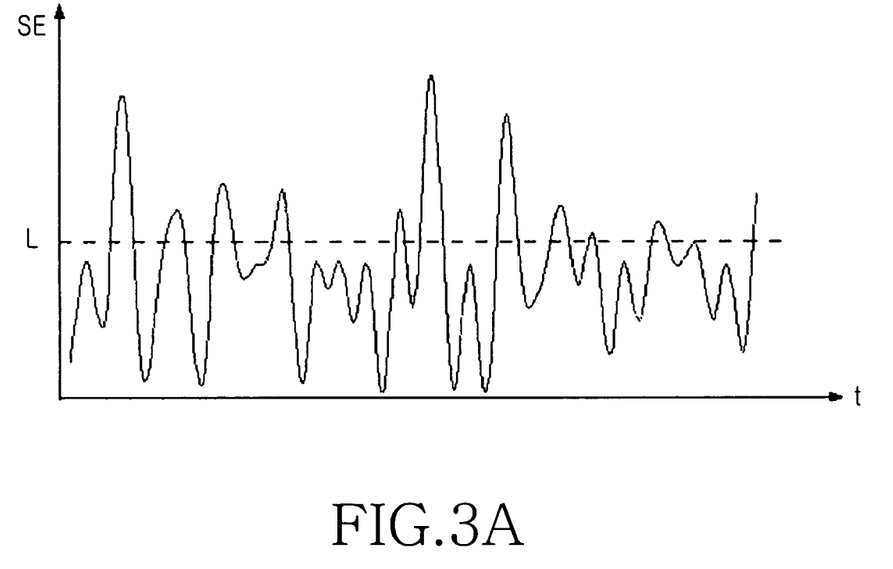
FIGS. 3A to 3C are views for illustrating peak-removed signals in an apparatus according to an embodiment of the present invention.
Figure 3B:
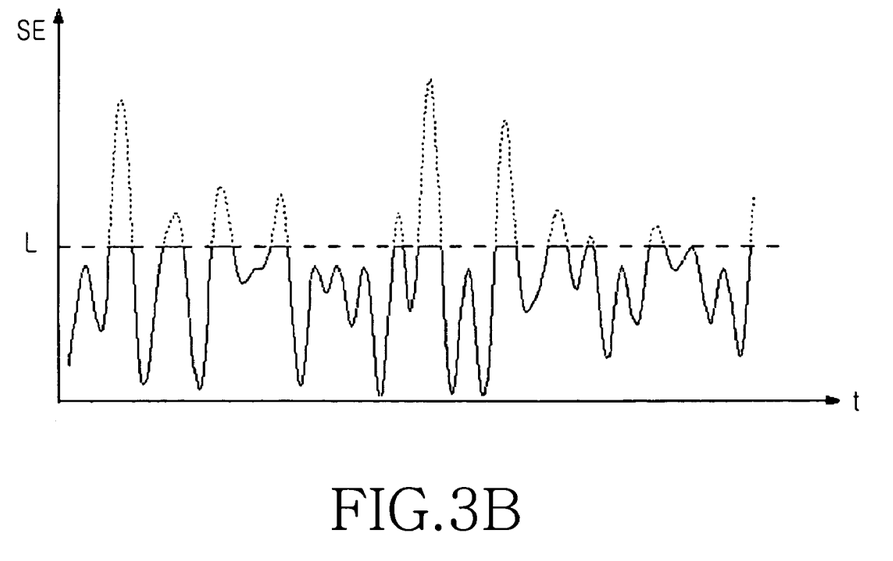
Figure 3C:
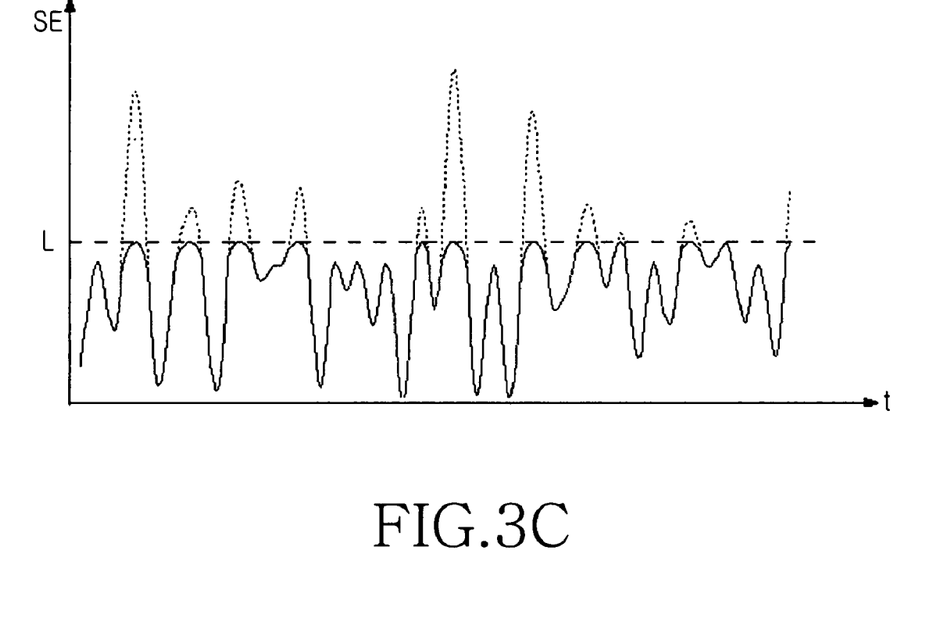

The peak reduction schemes may be classified into a hard clipping scheme and a soft clipping scheme according to the methods used for removing a peak signal. According to the hard clipping scheme, when high-PAR signals having a signal envelope such as shown FIG. 3A is input, signals having a smaller signal envelope than a predetermined value L pass, and signals having a larger signal envelope than a predetermined value L are removed as shown in FIG. 3B. According to the soft clipping scheme, when high-PAR signals having a signal envelope such as shown FIG. 3A is input, signals having a smaller signal envelope than a predetermined value L pass, and the clipping amount of signals having a larger signal envelope than a predetermined value L changes according to the signal envelope as shown FIG. 3C. Since the hard clipping scheme increases the spectral re-growth of an input signal, it is preferred to use the soft clipping scheme to remove a peak signal.

Referring again to FIG. 2, the peak-reduced signal generator (PSG) 220 reduces a peak value of the baseband signal according to the scale factor, thereby generating the peak-reduced signal. The peak-reduced signal is obtained by multiplying the baseband signal by the scale factor. The peak-reduced signal is delayed for a predetermined period of time in a first delay unit (peak-reduced signal delay unit; PRSD) 235 to compensate for a time difference between the peak-reduced signal and the error signal, before being input to a first quadrature modulator (peak-reduced signal quadrature modulator; PQM) 240.

A configuration for obtaining the error signal (ES) in the signal generation section 210 will now be described. First, the baseband signal is delayed for a predetermined period of time by a second delay unit (BS delay; BSD) 260 so as to compensate for a time difference between the baseband signal and the peak-reduced signal. Then, an error signal generator (ESG) 265 generates the error signal by subtracting the peak-reduced signal generated by the peak-reduced signal generator 220 from a delayed baseband signal (DBS) output from the second delay unit 260, and then inputs the generated error signal to a second quadrature modulator (error signal quadrature modulator; EQM) 270.

First, in the peak-reduced signal amplification section 255, the first quadrature modulator 240 up-converts the peak-reduced signal in a radio frequency band and then couples the up-converted peak-reduced signal with a local oscillation signal output from an RF local oscillator (RFLO) 245, thereby changing the peak-reduced signal into a first quadrature-modulated signal (peak-reduced quadrature-modulated signal; PQS). Then, a first power amplifier (radio frequency power amplifier; RFPA) 250 amplifies the first quadrature-modulated signal and outputs a first amplified PQS (APQS).

In the error correction amplification section 285, the second quadrature modulator 270 up-converts the error signal in a radio frequency band and then couples the up-converted error signal with a local oscillation signal output from the RF local oscillator (RFLO) 245, thereby changing the error signal into a second quadrature-modulated signal (error quadrature-modulated signal; EQS).

An error compensation unit (error quadrature-modulated signal compensation unit; EQC) 275 compensates for the size, the phase, and the delay of the second quadrature-modulated signal (EQS) and sends the compensated signal to a second power amplifier (radio frequency error correction amplifier; RFEA) 280 so that a signal amplified by the peak-reduced signal amplification section 255 and a signal amplified by the error correction amplification section 285 may be coupled with each other. The second power amplifier (RFEA) 280 amplifies the compensated EQS and outputs a second amplified signal (amplified EQS; AEQS).

Then, the summer 290 couples the first amplified signal (APQS) and the second amplified signal (AEQS) and outputs a final amplified output signal (AOS).

Figure 4A:
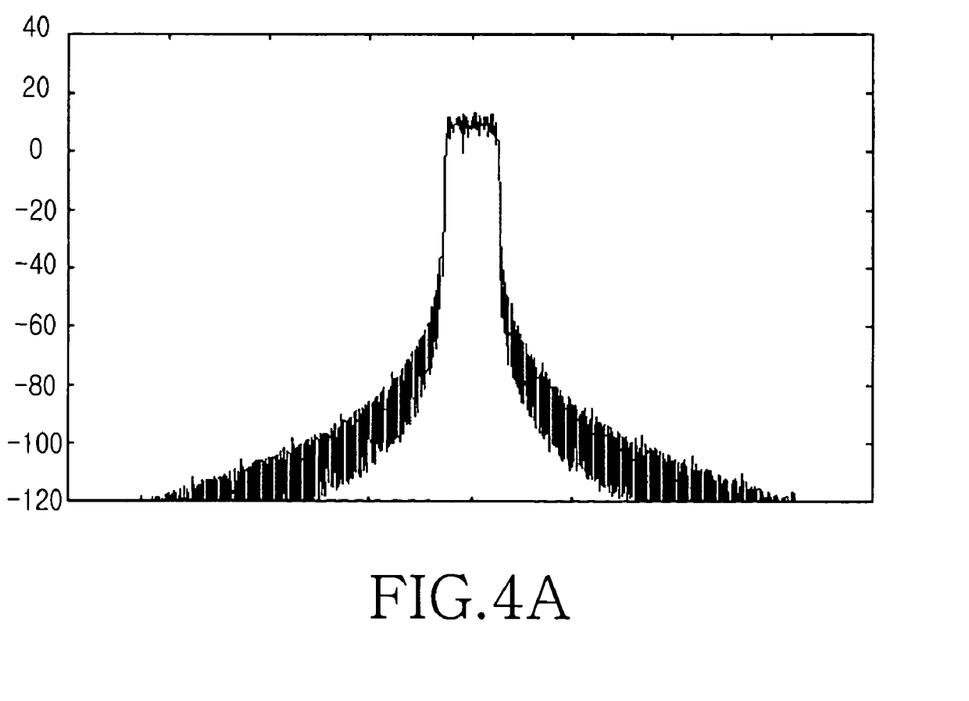
FIGS. 4A to 4C are views illustrating frequency response characteristics of signals in an apparatus according to an embodiment of the present invention.
Figure 4B:
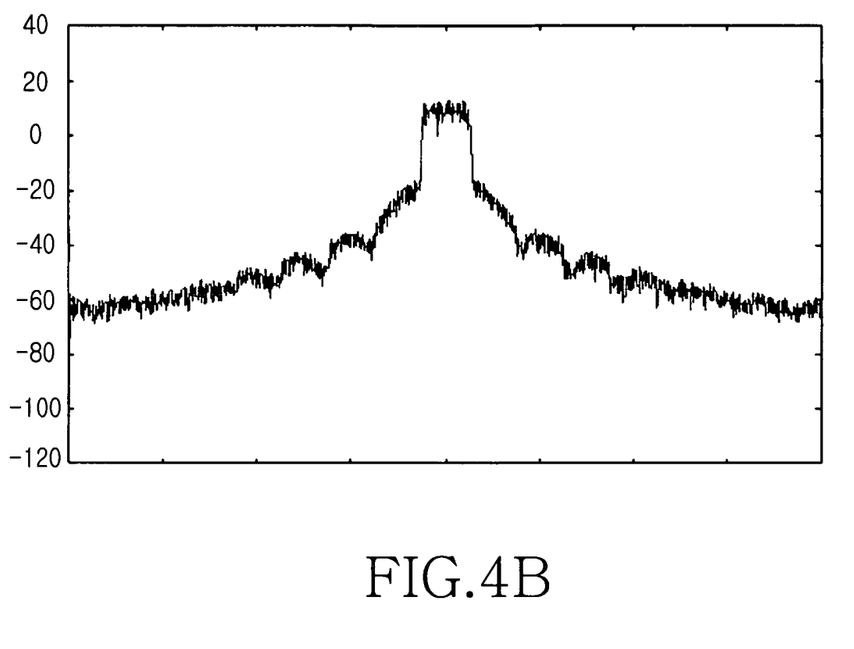
Figure 4C:
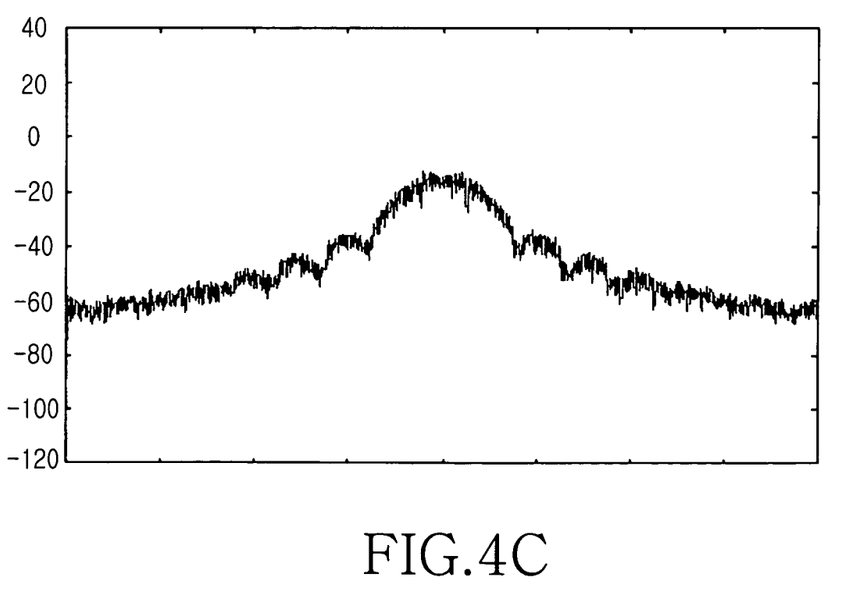
Figure 5:
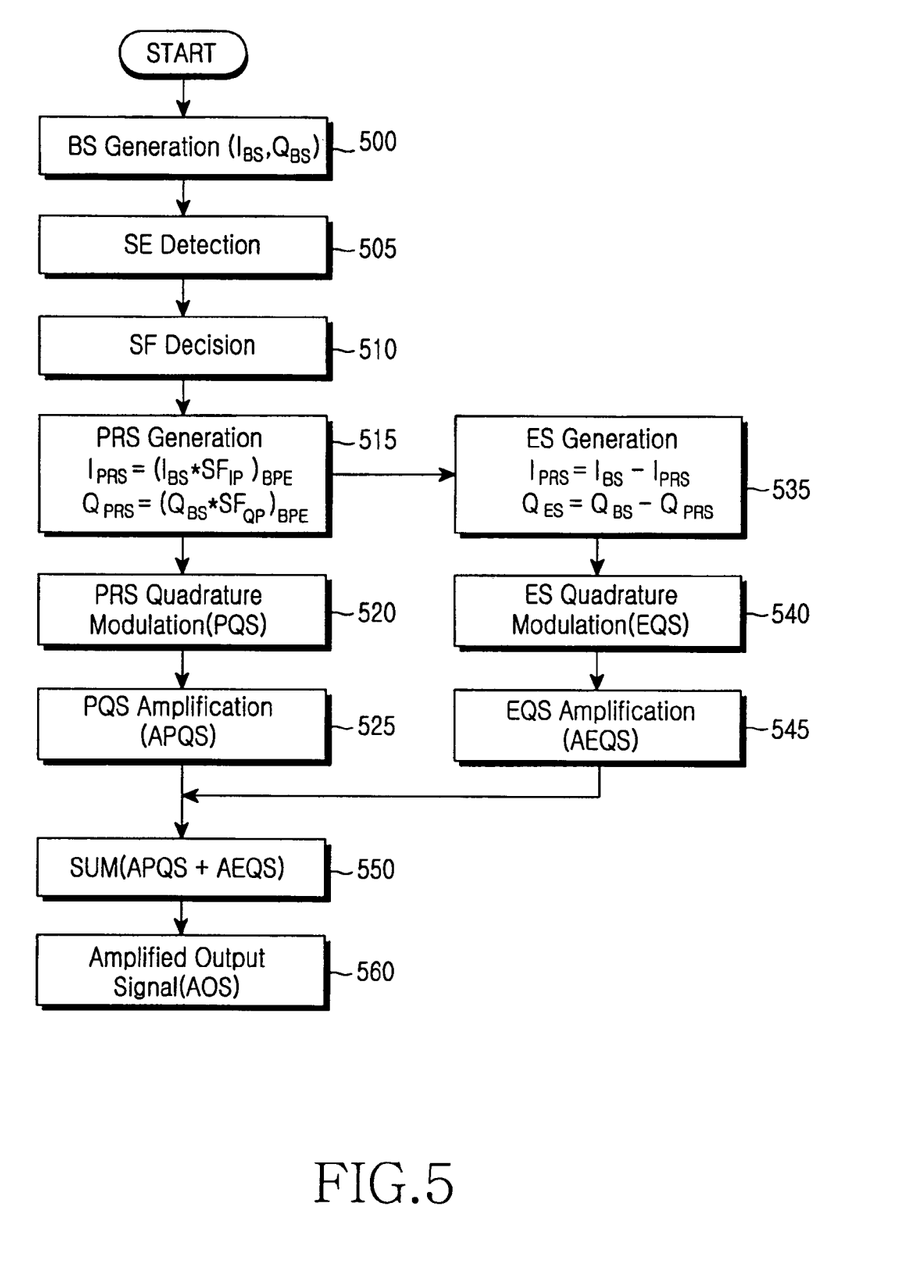
FIG. 5 is a flowchart illustrating a process for improving the efficiency of the power amplifier according to the first embodiment of the present invention.

FIGS. 4A to 4C are views representing frequency response characteristics of signals in the apparatus according to an embodiment of the present invention, and FIG. 5 is a flowchart illustrating a process for improving the efficiency of a power amplifier according to the first embodiment of the present invention.

In step 500, the baseband signal generator 205 inputs a baseband signal including an in-phase component (IBS) and a quadrature phase component (QBS) to the envelope detector 225, the peak-reduced signal generator 220, and the second delay unit 260. The frequency response characteristic of the baseband signal is shown in FIG. 4A. In step 505, the envelope detector 225 detects a signal envelope of the baseband signal, checks whether or not the detected signal envelope exceeds a predetermined reference value L, and detects how much the detected signal envelope exceeds a predetermined reference value L if the detected signal envelope exceeds a predetermined reference value L.

If the detected signal envelope does not exceed a predetermined reference value L, it is unnecessary to perform clipping with respect to the baseband signal. In contrast, if the detected signal envelope exceeds a predetermined reference value L, a scale factor is determined by the scale factor decider 230 according to the excess amount of the detected signal envelope on the basis of the reference value L in step 510 so as to minimize an error rate and spectral re-growth generated when the excess portion of the baseband signal is clipped. The scale factor includes a first scale factor (SFI) for the in-phase component (IBS) and a second scale factor (SFQ) for the quadrature phase component (QBS).

In step 515, the peak-reduced signal generator 220 generates a peak-reduced signal by multiplying the baseband signal by the scale factor. The frequency response characteristic of the peak-reduced signal is shown in FIG. 4B.

The peak-reduced signal generated from the peak-reduced signal generator 220 passes through the first delay unit (PRSD) 235 and is input to the first quadrature modulator (PQM) 240. In step 520, the peak-reduced signal input to the first quadrature modulator 240 is coupled with a local oscillation signal output from the RF local oscillator (RFLO) 245, thereby changing into a first quadrature-modulated signal (PQS) up-converted to a radio frequency band. In step 525, the first quadrature-modulated signal (PQS) is amplified by the first power amplifier (RFPA) 250, thereby changing into a first amplified signal (APQS).

Meanwhile, in step 535, the error signal generator 265 subtracts the peak-reduced signal from the delayed baseband signal (DBS) having passed through the second delay unit (BSD) 260, thereby generating an error signal. The error signal is the peak signal of the baseband signal, the frequency response characteristic of which is shown in FIG. 4C. The second delay unit (BSD) 260 delays the baseband signal to generate the delayed baseband signal to synchronize the delayed baseband signal and the peak-reduced signal.

The error signal generated from the error signal generator 265 is input to the second quadrature modulator (EQM) 270. In step 540, the error signal input to the second quadrature modulator (EQM) 270 is coupled with a local oscillation signal output from the RF local oscillator 245, thereby changing into a second quadrature-modulated signal (EQS) up-converted to a radio frequency band. In step 545, the second quadrature-modulated signal (EQS) passes through the error compensation unit (EQC) 275 and then is amplified by the second power amplifier (RFEA) 280, thereby changing into a second amplified signal (AEQS). In this case, the error compensation unit (EQC) 275 compensates for the size, the gain, and the delay of the second quadrature-modulated signal (EQS) in consideration of amplification characteristics of the first power amplifier (RFPA) 250 and the second power amplifier (RFEA) 280, and then transmits the compensated EQS to the second power amplifier (RFEA) 280.

In step 550, the first amplified signal (APQS) and the second amplified signal (AEQS) amplified by the first power amplifier (RFPA) 250 and the second power amplifier (RFEA) 280, respectively, are coupled with each other in the summer 290. In step 560, the summer 290 outputs an amplified output signal generated as a result of step 550. By such coupling, it is possible not only to compensate for a portion clipped by the peak-reduced signal generator 220 but also to remove an error and spectral re-growth in the first amplified signal (APQS).

FIG. 6 is a block diagram illustrating an apparatus for improving the efficiency of a power amplifier according to a second embodiment of the present invention.

The apparatus shown in FIG. 6, as shown in FIG. 2, includes a baseband signal generator (BSG) 605, a signal generation section 610, a peak-reduced signal amplification section (main amplification section) 655, an error correction amplification section 685, and a summer (SUM) 690. The baseband signal generator 605 generates a baseband signal having a high PAR. The signal generation section 610 generates and outputs a peak-reduced signal obtained by reducing a peak value of the baseband signal and an error signal representing a difference between the baseband signal and the peak-reduced signal. The peak-reduced signal amplification section 655 amplifies the peak-reduced signal output from the signal generation section 610 in a radio frequency band, and the error correction amplification section 685 amplifies the error signal output from the signal generation section 610 in a radio frequency band. The summer 690 couples a signal amplified by the peak-reduced signal amplification section 655 and a signal amplified by the error correction amplification section 685 to each other and outputs the coupled signal.

As compared with the apparatus shown in FIG. 2, the apparatus shown in FIG. 6 has a difference in that the signal generation section is constructed for a scale factor signal to be output to an error signal generator.

A construction for obtaining the error signal (ES) in the signal generation section 610 will now be described. An envelope detector (BED) 625 detects envelope information (i.e., a signal envelope detection level; EDL) of the baseband signal, and then a scale factor determiner (SFD) 630 determines a scale factor (SF) for reducing the peak value of the baseband signal using the size information (EDL) detected by the envelope detector 625. The scale factor represents a rate for reducing the peak value and is determined to minimize the spectral re-growths of a peak-reduced signal and an error signal. The scale factor is obtained by well-known peak reduction schemes. Therefore, a detailed description will be omitted.

The peak reduction schemes may be classified into a hard clipping scheme and a soft clipping scheme according to the methods of removing a peak signal. According to the hard clipping scheme, when high-PAR signals having signal envelope such as shown FIG. 3A is input, signals having a smaller signal envelope than a predetermined value L pass, and signals having a larger signal envelope than a predetermined value L are removed as shown in FIG. 3B. According to the soft clipping scheme, when high-PAR signals having a signal envelope such as shown FIG. 3A is input, signals having a smaller signal envelope than a predetermined value L pass, and the clipping amount of signals having a larger signal envelope than a predetermined value L changes according to the signal envelope. Since the hard clipping scheme increases the spectral re-growth of an input signal, it is preferred to use the soft clipping scheme to remove a peak signal.

An error signal generator (ESG) 620 reduces a peak value of the baseband signal according to the scale factor, thereby generating the error signal. The error signal is obtained by multiplying the baseband signal by the scale factor. The error signal is delayed for a predetermined period of time in a first delay unit (error signal delay unit; ESD) 635 so as to compensate for a time difference between the peak-reduced signal and the error signal, before the error signal is input to a second quadrature modulator (error signal quadrature modulator; EQM) 670.

A configuration for obtaining the peak-reduced signal (PRS) in the signal generation section 610 will now be described. First, the baseband signal is delayed for a predetermined period of time by a second delay unit (BS delay; BSD) 660 so as to compensate for a time difference between the baseband signal and the peak-reduced signal. Then, a peak-reduced signal generator (PSG) 665 generates the peak-reduced signal by subtracting the error signal generated by the error signal generator 620 from a delayed baseband signal (DBS) output from the second delay unit 660, and then inputs the generated peak-reduced signal to a first quadrature modulator (peak-reduced signal quadrature modulator; PQM) 640.

The construction and operation of the RFLO 650, a peak-reduced signal amplification section (main amplification section) 655 comprising PQM 640 and RFPA 650, an error correction amplification section 685 comprising EQM 670, EQC 675 and RFEA 680, and the summer (SUM) 690 are identical to 245, 255, 285 and 290 described with reference to FIG. 2, a detailed description of which will be omitted.

Figure 7:
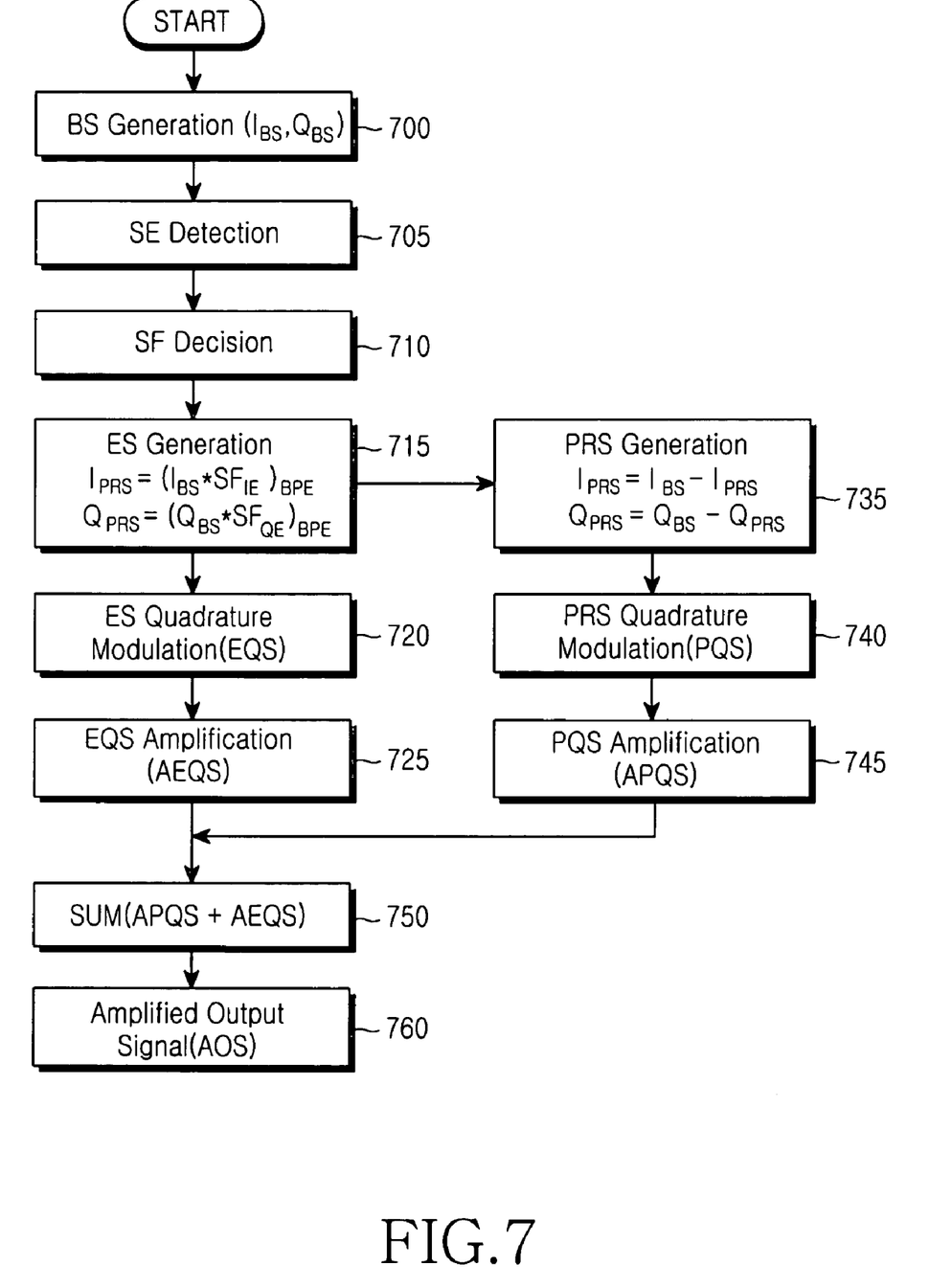
FIG. 7 is a flowchart illustrating a process for improving the efficiency of the power amplifier according to the second embodiment of the present invention.

FIG. 7 is a flowchart illustrating a process for improving the efficiency of a power amplifier according to the second embodiment of the present invention.

In step 700, the baseband signal generator 605 inputs a baseband signal including an in-phase component (IBS) and a quadrature phase component (QBS) to the envelope detector 625, the error signal generator 620, and the second delay unit 660. The frequency response characteristic of the baseband signal is shown in FIG. 4A. In step 705, the envelope detector 625 detects a signal envelope of the baseband signal, checks whether or not the detected signal envelope exceeds a predetermined reference value L, and detects how much the detected signal envelope exceeds a predetermined reference value L if the detected signal exceeds a predetermined reference value L.

If the detected signal envelope does not exceed a predetermined reference value L, it is unnecessary to perform clipping with respect to the baseband signal. In contrast, if the detected signal envelope exceeds a predetermined reference value L, a scale factor is determined by the scale factor decider 630 according to the excess amount of the detected signal envelope on the basis of the reference value L in step 710 to minimize an error rate and spectral re-growth generated when the excess portion of the baseband signal is clipped. The scale factor includes a first scale factor (SFI) for the in-phase component (IBS) and a second scale factor (SFQ) for the quadrature phase component (QBS).

In step 715, the error signal generator 620 generates an error signal by multiplying the baseband signal by the scale factor. The frequency response characteristic of the error signal is shown in FIG. 4B.

The error signal generated from the error signal generator 620 passes through the first delay unit (ESD) 635 and is input to the second quadrature modulator (EQM) 670. In step 720, the error signal input to the second quadrature modulator 670 is coupled with a local oscillation signal output from the RF local oscillator (RFLO) 650, thereby changing into a second quadrature-modulated signal (EQS) up-converted to a radio frequency band. In step 725, the second quadrature-modulated signal (EQS) passes through the error compensation unit (EQC) 675 and is amplified by the second power amplifier (RFPA) 650, thereby changing into a second amplified signal (AEQS).

In this case, the error compensation unit (EQC) 675 compensates for the size, the gain, and the delay of the second quadrature-modulated signal (EQS) in consideration of amplification characteristics of the first power amplifier (RFPA) 650 and the second power amplifier (RFEA) 680, and then transmits the compensated EQS to the second power amplifier (RFEA) 680.

Meanwhile, in step 735, the peak-reduced signal generator 665 subtracts the error signal from the delayed baseband signal (DBS) having passed through the second delay unit (BSD) 660, thereby generating a peak-reduced signal. The peak-reduced signal is the peak signal of the baseband signal, the frequency response characteristic of which is shown in FIG. 4C. The second delay unit (BSD) 660 delays the baseband signal to generate the delayed baseband signal in order to synchronize the delayed baseband signal and the error signal.

The peak-reduced signal generated from the peak-reduced signal generator 665 is input to the first quadrature modulator (PQM) 640. In step 740, the peak-reduced signal input to the first quadrature modulator (PQM) 640 is coupled with a local oscillation signal output from the RF local oscillator 645, thereby changing into a first quadrature-modulated signal (PQS) up-converted to a radio frequency band. In step 745, the first quadrature-modulated signal (PQS) is amplified by the first power amplifier (RFPA) 650, thereby changing into a first amplified signal (APQS).

In step 750, the first amplified signal (APQS) and the second amplified signal (AEQS) amplified by the first power amplifier (RFPA) 650 and the second power amplifier (RFEA) 680 respectively, are coupled with each other in the summer 690. In step 760, the summer 690 outputs an amplified output signal generated as a result of step 750. By such coupling, it is possible not only to compensate for a portion clipped by the error signal generator 620 but also to remove an error and spectral re-growth in the first amplified signal (APQS).

In the constructions shown in FIGS. 2 and 6, the efficiency of the first power amplifier (RFPA) can be improved by converting an input signal having a high PAR into a signal having a low PAR using the peak reduction scheme. However, in this case, an error rate and spectral re-growth of a signal output from the first power amplifier (RFPA) increases. In order to solve this problem, the embodiments of the present invention compensate for the increased error rate and spectral re-growth of a signal, which is output from the first power amplifier (RFPA), using an output signal of the second power amplifier (RFEA), so that the error rate and the spectral re-growth are improved while the efficiency of the first power amplifier (RFPA) increases. A primary factor for determining the improvement degree of the efficiency of the first power amplifier (RFPA) is the PAR of a peak-reduced signal, and a primary factor of determining the capacity of the second power amplifier (RFEA) is the spectral re-growth of a peak-reduced signal (i.e., the size of an error signal).

In order to obtain an optimum efficiency improvement, a characteristic required for a peak-reduced signal is that both the PAR and the spectral re-growth of the peak-reduced signal are low. If peak portions of a peak-reduced signal are removed similarly to the hard clipping as shown in FIG. 3B, the PAR of the first quadrature-modulated signal (PQS) generated from the peak-reduced signal decreases, thereby improving the efficiency of the first power amplifier (RFPA). However, in this case, the spectral re-growth of the first power amplifier (RFPA) is deteriorated, and thus the necessary capacity of the second power amplifier (RFEA) increases, which exerts a bad effect upon the efficiency improvement of the whole system. Therefore, in order to optimize the efficiency of the whole system, it is necessary to generate the peak-reduced signal having both a low PAR and low spectral re-growth.

Hereinafter, an apparatus according to a third embodiment of the present invention will be described with respect to a case in which envelope detection for bias adaptation in a transmission structure of a base station using peak reduction and error compensation is performed in a radio frequency band with reference to FIG. 8.

A peak-reduced signal generated from a signal generator 810 is input to a first quadrature modulator (PQM) 840 and is coupled with a local oscillation signal output from an RF local oscillator (RFLO) 845 in the first quadrature modulator 840, thereby changing into a first quadrature-modulated signal (PQS) up-converted to a radio frequency band. A first quadrature-modulated signal coupler (peak reduction quadrature-modulated signal coupler; PQSC) 847 separates the first quadrature-modulated signal in order to distribute the first quadrature-modulated signal to a first quadrature-modulated signal envelope detection unit (PQS envelope detection unit; PED) 848 and a first power amplifier (radio frequency power amplifier; RFPA) 850. The first quadrature-modulated signal envelope detection unit 848 transmits a first quadrature-modulated signal envelope detection level (PQS envelope detection level; PEDL), which is a detected envelope of the first quadrature-modulated signal, to a first power amplifier bias adaptation controller (RFPA bias adaptation controller; PBAC) 849. The first power amplifier 850 amplifies the first quadrature-modulated signal that was input to convert the first quadrature-modulated signal that was input into a first amplified signal (APQS). The first power amplifier bias adaptation controller 849 changes a bias to be provided to a radio transistor (RF transistor) included in the first power amplifier 850 by controlling a first power amplifier bias adaptation control signal (RFPA bias adaptation controller signal; PBS) using the detected first quadrature-modulated signal envelope detection level so that the first power amplifier 850 amplifying the first quadrature-modulated signal can operate in a bias adaptation scheme.

The bias adaptation schemes which can be applied to the first power amplifier 850 include a drain bias control scheme for controlling the supply voltage for the drain of a transistor used in the first power amplifier 850, a gate bias control scheme for controlling the supply voltage for the gate of a transistor used in the first power amplifier 850 to control the supply current for the drain of the transistor, and a dual bias control scheme using the drain bias control scheme and the gate bias control scheme at the same time. Since the first quadrature-modulated signal (PQS) amplified in the first power amplifier 850 has a lower PAR than that of the baseband signal owing to peak reduction, the linearity and the efficiency of the first power amplifier 850 are improved, and also it is possible to obtain additional improvement effects of the linearity and the efficiency of the first power amplifier 850 by applying the bias adaptation scheme to the first power amplifier 850.

An error signal generated from the signal generator 810 is input to a second quadrature modulator (EQM) 870 and is coupled with a local oscillation signal output from an RF local oscillator (RFLO) 845 in the second quadrature modulator 870, thereby changing into a second quadrature-modulated signal (EQS) 875 up-converted to a radio frequency band. The second quadrature-modulated signal input to an error compensation unit (EQC) undergoes time delay, envelope change, and phase change processes, and then is transmitted to a second quadrature-modulated signal coupler (error quadrature-modulated signal coupler; EQSC) 877. The second quadrature-modulated signal coupler 877 separates the second quadrature-modulated signal to distribute the second quadrature-modulated signal to a second quadrature-modulated signal envelope detection unit (EQS envelope detection unit; EED) 878 and a second power amplifier (RFEA) 880. The second quadrature-modulated signal envelope detection unit 878 transmits a second quadrature-modulated signal envelope detection level (EQS envelope detection level; EEDL), which is a detected envelope of the second quadrature-modulated signal, to a second power amplifier bias adaptation controller (RFEA bias adaptation controller; EBAC) 879. The second power amplifier 880 amplifies the input second quadrature-modulated signal to convert the input second quadrature-modulated signal into a second amplified signal (AEQS). The second power amplifier bias adaptation controller 879 controls a second power amplifier bias adaptation control signal (RFEA bias adaptation controller signal; EBS) using the detected second quadrature-modulated signal envelope detection level so that the second power amplifier 880 amplifying the second quadrature-modulated signal can operate in a bias adaptation scheme.

The bias adaptation schemes which can be applied to the second power amplifier 880 include a drain bias control scheme for controlling the supply voltage for a transistor used in the second power amplifier 880, a gate bias control scheme for controlling the supply current for a transistor used in the second power amplifier 880, and a dual bias control scheme using the drain bias control scheme and the gate bias control scheme at the same time. The second quadrature-modulated signal (EQS) amplified in the second power amplifier 880 has a much higher PAR than that of the baseband signal. Therefore, when the bias scheme is applied to the second power amplifier 880, the linearity and the efficiency of the second power amplifier 880 are improved much more than those of the case in which the bias scheme is applied to first power amplifier 850 amplifying a signal having a relatively lower PAR.

FIG. 9 shows a case in which envelope detection for bias adaptation in a transmission structure of a base station using peak reduction and error compensation is performed in a baseband, operations of which will now be described.

A peak-reduced signal/error signal generator (PEG) 910 separates a peak-reduced signal and an error signal and transmits the peak-reduced signal and the error signal to a first quadrature modulator (PQM) 940 and a second quadrature modulator (EQM) 970. In addition, since the PEG 910 can detect the signal envelope (SE) of the peak-reduced signal and the signal envelope (SE) of the error signal, the PEG 910 directly detects and transmits a first quadrature-modulated signal envelope detection level (PEDL) and a second quadrature-modulated signal envelope detection level (EEDL) to a first power amplifier bias adaptation controller (PBAC) 949 and a second power amplifier bias adaptation controller (EBAC) 979, respectively. A first quadrature-modulated signal (PQS) output from the first quadrature modulator 940 is input to a first power amplifier (RFPA) 950, which is an RF power amplifier, and a second quadrature-modulated signal (EQS) output from the second quadrature modulator 970 passes through an error compensation (EQC) 975 and is input to a second power amplifier (RFEA) 980. The first power amplifier bias adaptation controller (PBAC) 949 controls an RFPA bias adaptation controller signal (PBS) transmitted to the first power amplifier 950 using the first quadrature-modulated signal envelope detection level (PEDL) so that a bias adaptation scheme can be applied to the first power amplifier 950 when the first power amplifier 950 amplifies the first quadrature-modulated signal (PQS). The second power amplifier bias adaptation controller (EBAC) 979 controls an RFEA bias adaptation controller signal (EBS) transmitted to the second power amplifier 980 using the second quadrature-modulated signal envelope detection level (EEDL) so that a bias adaptation scheme can be applied to the second power amplifier 980 when the second power amplifier 980 amplifies the second quadrature-modulated signal (EQS).

The bias adaptation schemes which can be applied to the first power amplifier 950 include a drain bias control scheme for controlling the supply voltage for the drain of a transistor used in the first power amplifier 950, a gate bias control scheme for controlling the supply voltage for the gate of a transistor used in the first power amplifier 950 to control the supply current for the drain of the transistor, and a dual bias control scheme using the drain bias control scheme and the gate bias control scheme at the same time. Since the first quadrature-modulated signal (PQS) amplified in the first power amplifier (RFPA) 950 has a lower PAR than that of the baseband signal owing to peak reduction, the linearity and the efficiency of the first power amplifier 950 are improved, and also it is possible to obtain additional improvement effects of the linearity and the efficiency of the first power amplifier 950 by applying the bias adaptation scheme to the first power amplifier 950.

The bias adaptation schemes which can be applied to the second power amplifier (RFEA) 980 include a drain bias control scheme for controlling the supply voltage for a transistor used in the second power amplifier 980, a gate bias control scheme for controlling the supply current for a transistor used in the second power amplifier 980, and a dual bias control scheme using the drain bias control scheme and the gate bias control scheme at the same time. The second quadrature-modulated signal (EQS) amplified in the second power amplifier 980 has a much higher PAR than that of the baseband signal. Therefore, when the bias scheme is applied to the second power amplifier 980, the linearity and the efficiency of the second power amplifier 980 are improved much more than those of the case in which the bias scheme is applied to first power amplifier 950 amplifying a signal having a relatively lower PAR.

In order to improve the efficiency and the linearity of the whole power amplifier, it is necessary for a peak-reduced signal to have both a low PAR and low spectral re-growth. If a scale factor (SF) is set for a peak-reduced signal to have a shape in close proximity to the shape resulting form the hard clipping as shown in FIG. 3B, the PARs of the peak-reduced signal and the first quadrature-modulated signal (PQS) decrease, thereby improving the efficiency of the first power amplifier (RFPA) 950. However, in this case, the spectral re-growth of the first power amplifier (RFPA) 950 increases, and thus the necessary capacity of the second power amplifier (RFEA) 980 increases, which exerts a bad effect upon the efficiency improvement of the whole system. Therefore, in order to optimize the efficiency improvement of the whole system, it is necessary to generate a peak-reduced signal having both a low PAR and low spectral re-growth.

The efficiency of the first power amplifier (RFPA) 950 can be greatly improved by converting an input signal having a high PAR into a signal having a low PAR using the peak reduction scheme. However, an error rate and spectral re-growth of a signal output from the first power amplifier (RFPA) 950 increases. An error rate and spectral re-growth increase due to the low PAR of the first quadrature-modulated signal (PQS), so that the output characteristic of a signal output from the first power amplifier (RFPA) 950 is significantly deteriorated. In order to solve this problem, the construction according to an embodiment of the present invention decreases the increased error rate and spectral re-growth using an output signal of the second power amplifier (RFEA) 980, so that the error rate and the spectral re-growth are improved while the efficiency of the first power amplifier (RFPA) 950 increases. A primary factor for determining the improvement degree of the efficiency of the first power amplifier (RFPA) 950 is the PAR of a peak-reduced signal, and a primary factor of determining the capacity of the second power amplifier (RFEA) 980 is the spectral re-growth of a peak-reduced signal (i.e., the size of an error signal).

Since the error compensation capability of the whole power amplifier is influenced by the amount of spectral re-growth added while the peak-reduced signal and the error signal pass through the peak-reduced signal amplification section and the error correction amplification section, respectively, spectral re-growth must not be added in the two amplification sections. An embodiment of the present invention uses a bias adaptation scheme to improve the linearity of the two amplification sections and to increase the efficiency of the first power amplifier (RFPA) 950 and the second power amplifier (RFEA) 980 because the performance of the whole power amplifier is greatly influenced by the linearity of the two amplification sections.

The embodiments of the present invention enable a high-efficiency power amplifier to be manufactured at a low-price. That is, according to embodiments of the present invention in a power amplifier of a mobile communication system which operates with an input signal having a high PAR in a mobile communication system, the efficiency of the power amplifier is improved by reducing the PAR of the input signal and also by removing the error rate and spectral re-growth increased due to the reduction of the PAR using the error compensation scheme, so that it is possible to manufacture the power amplifier at a low cost.

While the present invention has been shown and described with reference to certain embodiments thereof, it should be understood by those skilled in the art that various changes in form and details may be made therein without departing from the spirit and scope of the invention as defined by the appended claims.

What is claimed is:

1. A power amplification apparatus for amplifying a baseband signal having a high peak-to-average power ratio (PAR), the power amplification apparatus comprising:
    a signal generation section for generating an error signal representing a difference between the baseband signal and a peak-reduced signal and then generating the peak-reduced signal by subtracting the generated error signal from the baseband signal, and for outputting the generated signals;
    a peak-reduced signal amplification section for amplifying the peak-reduced signal outputted from the signal generation section in radio frequency band;
    an error correction amplification section for amplifying the error signal outputted from the signal generation section in radio frequency band; and
    a summer for coupling and outputting the signal amplified by the peak-reduced signal amplification section and the signal amplified by the error correction amplification section.

2. The power amplification apparatus as claimed in claim 1, wherein the peak-reduced signal amplification section comprises:
    a quadrature modulator for modulating the peak-reduced signal to generate a quadrature-modulated signal of a radio frequency band; and
    a power amplifier for amplifying the quadrature-modulated signal and outputting a first amplified signal.

3. The power amplification apparatus as claimed in claim 1, wherein the error correction amplification section comprises:
    a quadrature modulator for modulating the error signal to generate a quadrature-modulated signal of a radio frequency band; and
    a power amplifier for amplifying the quadrature-modulated signal and outputting a second amplified signal.

4. The power amplification apparatus as claimed in claim 3, wherein the error correction amplification section further comprises an error compensation unit which compensates a phase and a delay of a signal outputted from the quadrature modulator and outputs the compensated signal to the power amplifier.

5. The power amplification apparatus as claimed in claim 1, wherein the signal generation section comprises:
   an envelope detector for detecting a signal envelope of the baseband signal;
   a scale factor decider for deciding a scale factor for clipping an excess portion when the detected signal envelope exceeds a predetermined reference value;
   an error signal generator for generating the error signal by multiplying the baseband signal by the scale factor; and
   a peak-reduced signal generator for generating the peak-reduced signal by subtracting the generated error signal from the baseband signal.

6. The power amplification apparatus as claimed in claim 5, wherein the signal generation section further comprises:
   a first delay unit for delaying the error signal and outputting the delayed error signal to the error correction amplification section; and
   a second delay unit for delaying the baseband signal and outputting the delayed baseband signal to the reduced signal generator.

7. A method for improving efficiency of a power amplifier which amplifies a baseband signal having a high peak-to-average power ratio (PAR), the method comprising the steps of:
   a) generating an error signal representing a difference between the baseband signal and a peak-reduced signal and then generating the peak-reduced signal by subtracting the generated error signal from the baseband signal;
   b) amplifying the peak-reduced signal and the error signal in a radio frequency band; and
   c) coupling the amplified peak-reduced signal and the amplified error signal.

8. The method as claimed in claim 7, wherein step a) comprises the steps of:
   detecting a signal envelope of the baseband signal and deciding a scale factor for clipping an excess portion when the detected signal envelope exceeds a predetermined reference value;
   generating the error signal by multiplying the baseband signal by the scale factor; and
   generating the peak-reduced signal by subtracting the generated error signal from the baseband signal.

9. The method as claimed in claim 8, wherein step a) further comprises a step of delaying the baseband signal for generating the peak-reduced signal.

10. The method as claimed in claim 7, wherein step b) comprises the steps of:
    modulating the peak-reduced signal to generate a quadrature-modulated signal of a radio frequency band; and
    amplifying the quadrature-modulated signal and outputting a first amplified signal.

11. The method as claimed in claim 7, wherein step b) comprises the steps of:
    modulating the error signal to generate a quadrature-modulated signal of a radio frequency band; and
    amplifying the quadrature-modulated signal and outputting a second amplified signal.

12. The method as claimed in claim 11, wherein step b) further comprises a step of compensating a phase and delay of the quadrature-modulated signal before the quadrature-modulated signal is amplified.

13. A power amplification apparatus for amplifying a baseband signal having a high peak-to-average power ratio (PAR), the power amplification apparatus comprising:
    a signal generation section for generating and outputting a peak-reduced signal obtained by subtracting a peak value from the baseband signal and an error signal representing a difference between the baseband signal and the peak-reduced signal and for generating and outputting a quadrature-modulated signal envelope detection level of each of the peak-reduced signal and the error signal using envelopes of the generated peak-reduced signal and error signal;
    a peak-reduced signal amplification section for amplifying the peak-reduced signal outputted from the signal generation section in a bias adaptation scheme in radio frequency band;
    a first bias adaptation control section for generating a bias adaptation control signal using the quadrature-modulated signal envelope detection level of the peak-reduced signal outputted from the signal generation section and for outputting the generated bias adaptation control signal to the peak-reduced signal amplification section;
    an error correction amplification section for amplifying the error signal outputted from the signal generation section in a bias adaptation scheme in radio frequency band;
    a second bias adaptation control section for generating a bias adaptation control signal using the quadrature-modulated signal envelope detection level of the error signal outputted from the signal generation section and for outputting the generated bias adaptation control signal to the error correction amplification section; and
    a summer for coupling and outputting the signal amplified by the peak-reduced signal amplification section and the signal amplified by the error correction amplification section.

14. The power amplification apparatus as claimed in claim 13, wherein the peak-reduced signal amplification section comprises:
    a quadrature modulator for modulating the peak-reduced signal to generate a quadrature-modulated signal of a radio frequency band; and
    a power amplifier for amplifying the quadrature-modulated signal in an adaptation control scheme according to the bias adaptation control signal outputted from the first bias adaptation control section and outputting a first amplified signal.

15. The power amplification apparatus as claimed in claim 13, wherein the error correction amplification section comprises:
    a quadrature modulator for modulating the error signal to generate a quadrature-modulated signal of a radio frequency band; and
    a power amplifier for amplifying the quadrature-modulated signal in an adaptation control scheme according to the bias adaptation control signal outputted from the second bias adaptation control section and outputting a second amplified signal.

16. The power amplification apparatus as claimed in claim 15, wherein the error correction amplification section further comprises an error compensation unit which compensates a phase and a delay of a signal outputted from the quadrature modulator and outputs the compensated signal to the power amplifier.

* * * * *